United States Patent

Chiao

[19]

[11] Patent Number: 6,094,365
[45] Date of Patent: Jul. 25, 2000

[54] POWER SUPPLY DEVICE OF SWITCHING MODE WITH LEAKAGE CURRENT PROTECTION CIRCUIT

[76] Inventor: Po-Lun Chiao, No. 32, Lane 336, Yu Yuan N. Rd., Lung Ching Hsian, Taichung Hsien, Taiwan

[21] Appl. No.: 09/421,222

[22] Filed: Oct. 20, 1999

[51] Int. Cl.[7] .......................... H02M 3/335; H02H 7/122
[52] U.S. Cl. ............................... 363/56; 363/40; 363/21; 323/902
[58] Field of Search ................................. 363/21, 20, 50, 363/55, 56, 39, 40; 323/902

[56] References Cited

U.S. PATENT DOCUMENTS

| | | | |
|---|---|---|---|
| 4,625,270 | 11/1986 | Taylor | 363/39 |
| 4,743,789 | 5/1988 | Puskas | 310/317 |
| 4,785,207 | 11/1988 | Eng | 323/312 |
| 4,821,201 | 4/1989 | Takizawa | 363/20 |
| 5,748,459 | 5/1998 | Yamada et al. | 363/21 |

*Primary Examiner*—Adolf Deneke Berhane
*Assistant Examiner*—Bao Q. Vu
*Attorney, Agent, or Firm*—Browdy and Neimark

[57] ABSTRACT

A power supply device of a switching mode comprises a transformer, a direct current power supply circuit connected at an output end thereof with a first end of a primary winding of the transformer, a switching element connected at a first end thereof with a second end of the primary winding of the transformer and at a second end thereof with a ground, a control circuit connected at an output end thereof with the control end of the switching element for providing the switching element with a driving signal, a direct current output circuit connected at an input end thereof with the output end of a secondary winding of said transformer, a leakage current detection circuit connected at an input end thereof with a secondary side ground end of the transformer and at an output end thereof with a primary side ground end of the transformer for forming a leakage current loop and transmitting a leakage current signal at such time when a leakage current takes place. The power supply device further comprises a leakage current protection circuit which is coupled with the detection circuit such that the protection circuit is separated from the detection circuit, and that the protection circuit is controlled by the leakage current signal, and further that the protection circuit is connected at an output end thereof with an input end of the control circuit, and further that the protection circuit cuts off the output voltage as soon as the detection circuit transmits the leakage current signal.

7 Claims, 1 Drawing Sheet

POWER SUPPLY DEVICE OF SWITCHING MODE WITH LEAKAGE CURRENT PROTECTION CIRCUIT

FIELD OF THE INVENTION

The present invention relates generally to a power supply device, and more particularly to a power supply device which is of a switching mode and capable of providing protection against leakage current.

BACKGROUND OF THE INVENTION

The power supply device of the so-called switching mode comprises a switching element which is opened or closed in the state of high frequency so as to convert the alternating current input into the direct current output. In light of the advantage that the component parts of such a power supply device as described above can be miniaturized, the power supply device is widely used along with the electronic or communication equipment. However, the power supply device of the switching mode is by no means free from deficiencies. For example, the secondary side of the power supply device of the switching mode is vulnerable to leakage current due to a poor insulation or pressure resistance of the secondary side. If the leakage current is allowed to persist, the power supply device is prone to become a potential safety hazard. None of the conventional switching mode power supply device is provided with protection against leakage current.

SUMMARY OF THE INVENTION

It is therefore the primary objective of the present invention to provide a power supply device of the switching mode with a means for detecting the leakage current.

It is another objective of the present invention to provide a power supply device of the switching mode with a means for terminating the voltage output at the time when the leakage current takes place.

In keeping with the principle of the present invention, the foregoing objectives of the present invention are attained by a power supply device of the switching mode, which comprises a transformer, a direct current power supply circuit, a switching element, a control circuit, a direct current output circuit, a leakage circuit detection circuit, and a leakage current protection circuit. The transformer has a primary winding and at least one secondary winding. The direct current power supply circuit has an output end which is connected with a first end of the primary winding. The switching element has a first end which is connected with a second end of the primary winding. The switching element has a second end which is connected with a ground for starting or terminating the primary current which flows through the primary winding. The control circuit has an output end, which is connected with a control end of the switching element for providing the switching element with a driving signal. The direct current output circuit has an input end which is connected with an output end of the secondary winding, and an output end for delivering a direct current voltage. The leakage current detection circuit has an input end which is connected with a secondary side ground end of the transformer, and an output end which is connected with a primary side ground end of the transformer. A leakage current signal is transmitted by a leakage current loop which is formed at the time when the leakage current transpires. The leakage current protection circuit is coupled with the detection circuit such that the former is separated from the latter, and that the former is controlled by the leakage current signal of the latter. For example, the leakage current protection circuit is coupled with the detection circuit by means of a photocoupler such that an output end of the leakage current protection circuit is connected with an input end of the control circuit. When the detection circuit transmits the leakage current signal, the work of the control circuit is interrupted by the leakage current protection circuit. As a result, no signal is transmitted to drive the switching element. The output voltage is thus shut off.

The leakage current protection circuit may be provided with a signal comparison unit which has a first signal input end, a second signal input end, and a signal output end. In the absence of the leakage current signal, the first and the second signal input ends of the signal comparison unit are high level signals, whereas the signal output end of the signal comparison unit is a low level signal for enabling the control circuit to operate normally. Upon having received the leakage current signal, the second input end of the signal comparison unit becomes the low level signal, whereas the output end of the signal comparison unit becomes the high level signal. In the meantime, the leakage current protection circuit causes the work signal input end of the control circuit to become connected with the ground, thereby resulting in termination of the output of the driving signal. Subsequently, the output of the secondary winding of the transformer is shut off.

DETAILED DESCRIPTION OF THE INVENTION

Figure 1:
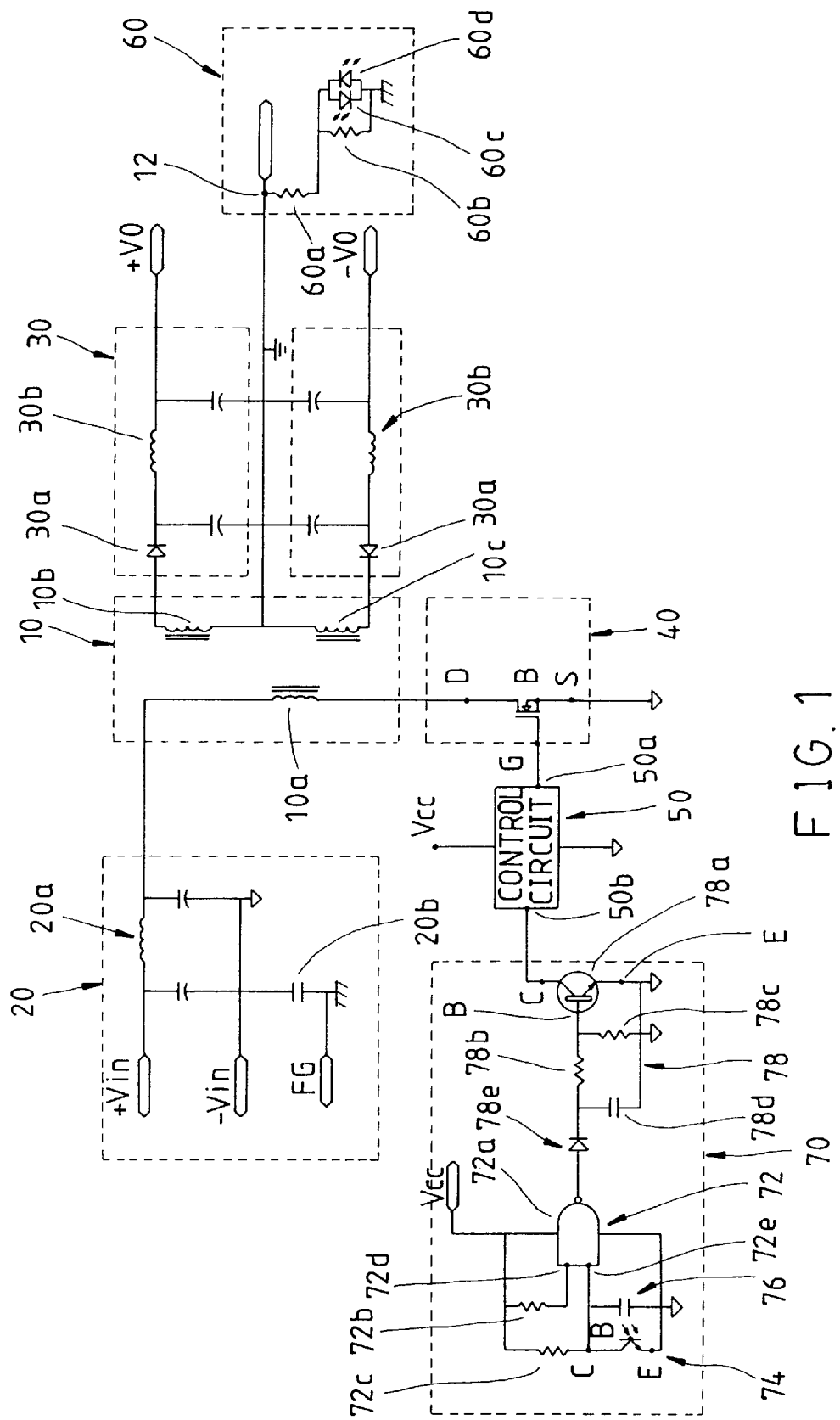
FIG. 1 shows a schematic view of a circuit design of a preferred embodiment of the present invention.

As shown in FIG. 1, the circuit design of the preferred embodiment of the present invention comprises the components which are described hereinafter.

A transformer 10 is provided with a primary winding 10a having a first end which is connected with the output end of a π filter 20a of a direct current power supply circuit 20. The input ends of the filter 20a are respectively connected with two output ends of a bridge rectifier (not shown in the drawing). The direct current power supply circuit 20 is connected with a ground via a capacitor 20b.

The transformer 10 is provided with two secondary windings 10a and 10b, which are connected in series. Each of the two secondary windings has a common secondary side ground end 12 and is connected at an output end thereof with a direct current output circuit 30, which has a rectifier diode 30a and a π filter 30b.

A metal oxide semiconductor field effect transistor (MOSFET) 40 is used as a switching element such that a drain D thereof is connected with the second end of the primary winding 10a of the transformer 10, and that a source S thereof is connected with the base B and the ground end, and further that a gate G thereof is connected with a signal output end 50a of a control circuit 50.

Under the circumstance of a normal operation, the control circuit 50 transmits a driving signal to enable the MOSFET 40 to operate in the state of high frequency such that the feedback direct current voltage of the primary winding 10a is cut into a square wave signal of high frequency. The square wave signal is converted by the transformer 10 so as to attain a predetermined voltage level in the secondary windings 10b and 10c. Subsequently, the output end attains a required direct current output voltage via the rectifying and the filtering of the direct current output circuit 30.

A leakage current detection circuit 60 is formed of a first resistor 60a and a second resistor 60b connected serially with the first resistor 60a, and two light-emitting diodes 60c and 60d of a photocoupling transistor which is in a parallel connection with the second resistor 60b. The detection circuit 60 is connected at one end thereof with the common ground end 12 of the secondary side of the transformer, and at other end thereof with the primary side ground end of the transformer. In the event that a leakage current takes place due to the poor resistance of the ground end of the output voltage to the pressure, the accidental contact with the human body, or the excessive humidity, the leakage current forms a current loop via the first resistor 60a, the second resistor 60b, the light-emitting diodes 60c and 60d, and the secondary side common ground end 12. The two light-emitting diodes are thus excited to emit light.

A leakage current protection circuit 70 is essentially composed of a signal comparison unit 72, a phototransistor 74 of the photocoupling transistor, a zener capacitor 76, and a transistor switching unit 78. The signal comparison unit 72 has an NAND gate 72a, and two resistors 72b and 72c. The first input end 72d and the second input end 72e of the NAND gate 72a are connected with a direct current power source after they are respectively connected in series with the resistors 72b and 72c. The phototransistor 74 has a collector C, which is connected with the second input end 72e of the NAND gate, a base B which is coupled with the light-emitting diodes 70c and 70d, and an emitter E which is connected with the ground. The zener capacitor 76 and the phototransistor 74 are connected in a parallel manner. The transistor switching unit 78 has a small signal transistor 78a, two resistors 78b and 78c and a capacitor 78d which form a bias circuit of the transistor 78a, and a diode 78e for preventing the reverse bias. The collector C of the transistor 78a is connected with a work signal input end 50b of the control circuit 50. The base B of the transistor 78a is first connected with the diode 78e and is then connected with an output 72f of the NAND gate 72a. The emitter E of the transistor 78a is connected with the ground.

In the absence of a leakage current, the phototransistor 74 remains in a closed state. The signals of the two input end of the NAND gate 72a are in the high level, whereas the signal of the output end of the NAND gate 72a is in the low level. Under such a circumstance as described above, the transistor switching unit 78 is closed. The power supply device operates normally. In the event that a leakage current is detected by the detection circuit 60, the light-emitting diodes 60c and 60d are excited to emit light such that the phototransistor 74 of the leakage current protection circuit 70 is induced by the light to become connected, thereby resulting in the conversion of the signal of the second input end of the NAND gate 72a from the high level into the low level and also in the conversion of the signal of the output end of the NAND gate 72a from the low level into the high level. In the meantime, the transistor switching unit 78 is connected such that the work signal input end of the control circuit 50 is connected with the ground. As a result, the work of the control circuit 50 is interrupted in such a manner that no more driving signal is transmitted. The MOSFET 40 is thus cut off. The output of the direct current output circuit 30 is shut off. The leakage current is stopped. It must be noted here that the embodiment of the present invention is so efficient that the termination of the output voltage is brought about in several ten units nS after the onset of a leakage current.

What is claimed is:

1. A power supply device of a switching mode, said device comprising:

a transformer provided with a primary winding and at least one secondary winding, said primary winding having a first end and a second end;

a direct current power supply circuit connected at an output end thereof with said first end of said primary winding;

a switching element having a first end, a second end, and a control end, with said first end being connected with said second end of said primary winding, and with said second end of said switching element being connected with a ground, for opening and closing a primary current that flows through said primary winding;

a control circuit connected at an output end thereof with said control end of said switching element for providing said switching element with a driving signal;

a direct current output circuit connected at an input end thereof with an output end of said primary winding such that an output end of said direct current output circuit delivers a direct current voltage;

a leakage current detection circuit connected at an input end thereof with a secondary side ground end of said transformer, and at an output end thereof with a primary side ground end of said transformer, for forming a current loop and transmitting a leakage current signal at the time when a leakage current takes place; and a leakage current protection circuit coupled with said detection circuit such that said protection circuit is separated from said detection circuit, and that said protection circuit is controlled by said leakage current signal of said detection circuit, and further that an output end of said protection circuit is connected with a work signal end of said control circuit, and further that said work signal input end of said control circuit is caused by said protection circuit to become connected with the ground at the time when said leakage current signal is transmitted by said detection circuit.

2. The power supply device as defined in claim 1, wherein said switching element is a metal oxide semiconductor field effect transistor (MOSFET) whereby said MOSFET has a drain serving as said first end, a source serving as said second end, and a gate serving as said control end.

3. The power supply device as defined in claim 1, wherein said leakage current detection circuit and said leakage current protection circuit are coupled by a photocoupler.

4. The power supply device as defined in claim 3, wherein said detection circuit comprises a first resistor and a second resistor connected in series with said first resistor, said detection circuit further comprising a light-emitting member of a photocoupler connected in a parallel manner with said second resistor whereby said light-emitting member is excited to emit light at the time when a leakage current flows through said detection circuit.

5. The power supply device as defined in claim 4, wherein said leakage current protection circuit comprises a signal comparison unit, a light-receiving member of said photocoupler, and a transistor switching unit, said signal comparison unit having a first signal input end, a second signal input end and a signal output end, with said first signal input end and said second signal input end being respectively connected in series with a resistor and then with a direct current power supply, said light-receiving member of said photocoupler being connected at an input end thereof with said second input end, and at an output end thereof with the ground, said transistor switching unit being connected at a control end thereof with said output end of said signal comparison unit, at an input end thereof with a work signal input end of said control circuit, and at an output end thereof with the ground, said first input end and said second input end of said signal comparison unit being high level signals and said output end of said signal comparison unit being a low level signal at such time when said light-receiving member is not exposed to light whereby said transistor switching unit is kept in a closed state and said control circuit operates normally, said second input end of said signal comparison unit becoming a low level signal and said output end of said signal comparison unit becoming a high level signal at the time when said light-receiving member is exposed to light whereby said transistor switching unit becomes connected such that said work signal input end of said control circuit is connected with the ground, thereby resulting in interruption of output of a driving signal as well as inaction of said switching element and the cut-off of output of said secondary winding.

6. The power supply device as defined in claim 5, wherein said photocoupler is a photocoupler transistor formed of a light-emitting diode and a phototransistor.

7. The power supply device as defined in claim 5, wherein said signal comparison unit is an NAND gate.

\* \* \* \* \*